(12) United States Patent
Bruun et al.

(10) Patent No.: US 11,394,624 B2
(45) Date of Patent: Jul. 19, 2022

(54) SYSTEMS AND METHODS FOR UNIFYING SERVICE ASSURANCE WITH SERVICE FULFILLMENT

(71) Applicant: Hewlett Packard Enterprise Development LP, Houston, TX (US)

(72) Inventors: Peter Michael Bruun, Alleroed (DK); Andres Duebi, Liebefeld (CH); Sebastien Gonin, Mougins (FR)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/074,657

(22) Filed: Oct. 20, 2020

(65) Prior Publication Data

US 2021/0273862 A1 Sep. 2, 2021

(30) Foreign Application Priority Data

Feb. 28, 2020 (EP) .................................... 20305212

(51) Int. Cl.
*G06F 15/173* (2006.01)
*H04L 41/5019* (2022.01)
(Continued)

(52) U.S. Cl.
CPC ...... *H04L 41/5019* (2013.01); *G06F 9/45558* (2013.01); *G06F 2009/4557* (2013.01);
(Continued)

(58) Field of Classification Search
CPC ............. H04L 41/5019; H04L 67/2842; H04L 43/0876; H04L 41/0806; G06F 9/45558;
(Continued)

(56) References Cited

U.S. PATENT DOCUMENTS 9,729,405 B2 8/2017 Safer et al.
2009/0181665 A1* 7/2009 Safer .................... H04L 41/5064
455/424

(Continued)

OTHER PUBLICATIONS

Robert Tarjan, "Depth-First Search and Linear Graph Algorithms," Siam J. Comput., vol. 1, No. 2, Jun. 1972, pp. 146-160.
(Continued)

*Primary Examiner* — John B Walsh
(74) *Attorney, Agent, or Firm* — Hewlett Packard Enterprise Patent Department

(57) ABSTRACT

Systems and methods are provided for closing the loop between service assurance and service fulfillment in service provider systems. Configuration parameter values relevant to assuring a determined level of quality regarding services can be obtained. Those configuration parameters may be configured by a service fulfillment system operatively connected to the service assurance system. Dependencies may be calculated between the configuration parameter values, event parameters, and fact parameters representative of the services. The services may be monitored, and events occurring during performance of the services may be identified. The identified events can be correlated to relevant ones of the event parameters. One or more corrective actions to take can be determined by the service assurance system based on the correlation of the identified events to the relevant ones of the event parameters. The one or more corrective actions are fed back into the service fulfillment system to be executed.

20 Claims, 8 Drawing Sheets

(51) Int. Cl.
*G06F 9/455* (2018.01)
*H04L 67/568* (2022.01)

(52) U.S. Cl.
CPC .............. *G06F 2009/45562* (2013.01); *G06F 2009/45575* (2013.01); *H04L 67/2842* (2013.01)

(58) Field of Classification Search
CPC ... G06F 2009/45562; G06F 2009/4557; G06F 2009/45575
See application file for complete search history.

(56) References Cited

U.S. PATENT DOCUMENTS

| | | | |
|---|---|---|---|
| 2010/0145755 | A1 | 6/2010 | Narkilahti |
| 2015/0019746 | A1* | 1/2015 | Shatzkamer .......... H04L 67/322 709/228 |
| 2018/0123939 | A1* | 5/2018 | Raman ................ H04L 43/0876 |
| 2019/0373021 | A1* | 12/2019 | Parthasarathy ..... G06F 9/45558 |
| 2019/0394081 | A1* | 12/2019 | Tahhan ............... H04L 41/0654 |

OTHER PUBLICATIONS

Devadatta et al., "ETSI ZSM Architectural Framework for End-to-end Service and Network Automation," Nov. 2018, https://sdn.ieee.org/home/sitemap/33-newsletter/oct-2018.

Kelly, P., "Automation in the Cloudnative Hybrid Network," Feb. 8, 2018, https://www.ibm.com/downloads/cas/YPN41REN.

Ni2, "Service Lifecycle Management," 2018, https://ni2.com/service-fulfillment/.

* cited by examiner

SYSTEMS AND METHODS FOR UNIFYING SERVICE ASSURANCE WITH SERVICE FULFILLMENT

DESCRIPTION OF RELATED ART

Service assurance can refer to the application of policies and processes by a service provider (SP), such as, for example, a communications SP (SP), to ensure that services offered over a communications network meets some pre-defined service quality for a positive subscriber experience.

Service fulfillment (also known as provisioning) can refer to various activities associated with assembling and making services available to subscribers from a SP. Oftentimes, these activities make up an operational infrastructure whose efficiency relies on the ability of a SP to match the supply of services with demand while maintaining service quality and reliability.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
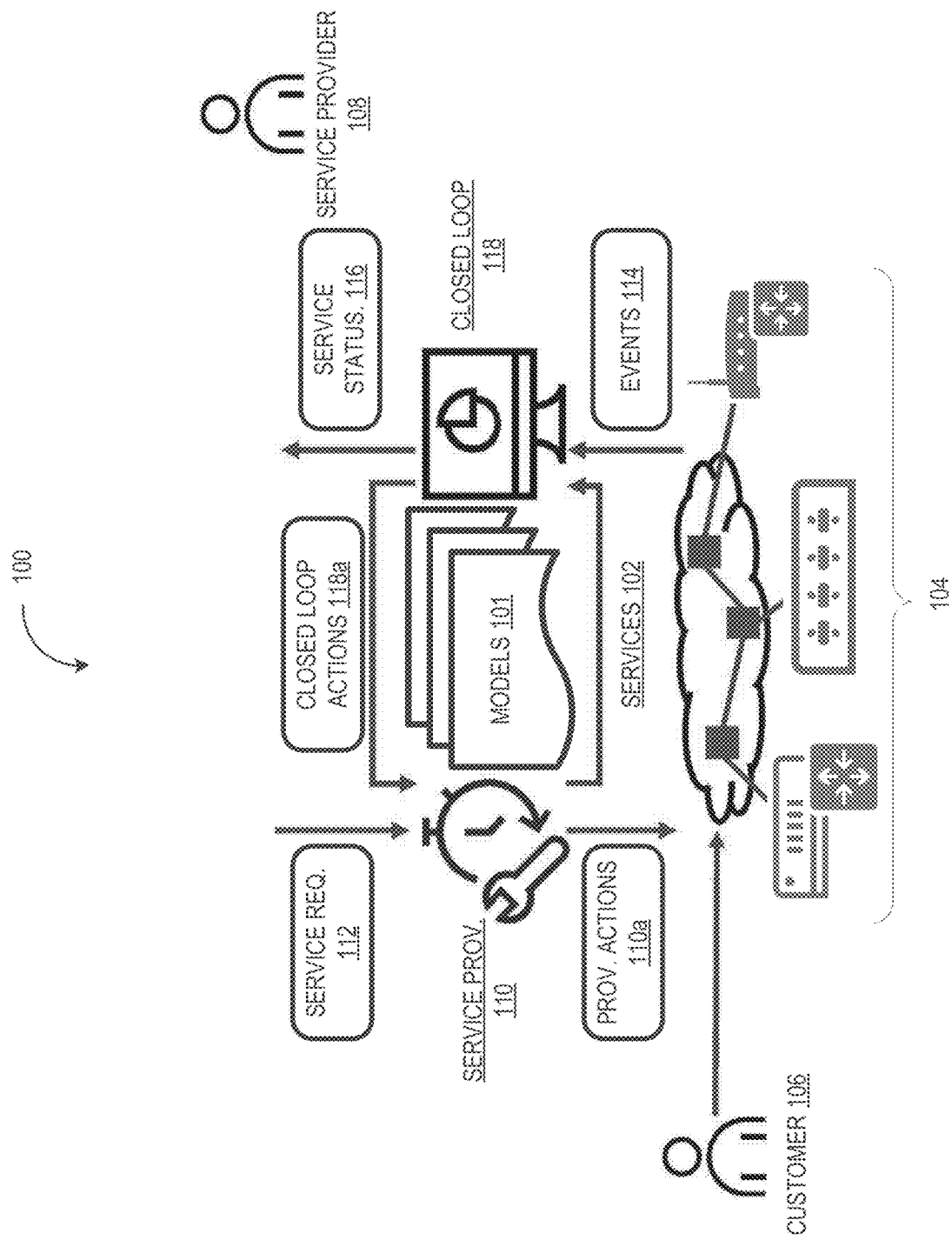
FIG. 1 illustrates an example service fulfillment and service assurance workflow in accordance with one embodiment of the disclosed technology.

The figures are not exhaustive and do not limit the present disclosure to the precise form disclosed.

DETAILED DESCRIPTION

As noted above, a SP's operation can involve both service fulfillment and service assurance. However, SP's typically view service fulfillment and service assurance as separate silos. That is, the personnel, processes, and resources resulting in the provisioning/activation of a service, i.e., service fulfillment, is often treated separately (and differently) than monitoring services and dealing with event generation and resolution, i.e., service assurance. This separate treatment of service fulfillment and service assurance has, in the past, led to disjointed efforts, e.g., development of service assurance having to wait until service fulfillment is already in place and deployed, service assurance solutions being configured differently from those of service fulfillment, etc. Moreover, this manner of dealing with service assurance and service fulfillment prevents "closing the loop," e.g., turning service level incidents into system-assisted and automated service fulfillment actions. It should be understood that as used herein, "closing the loop" can refer to a process by which: (1) a fulfillment request is received; (2) an action(s) is executed to fulfill the requirements of the fulfillment request; (3) monitoring services (which may be the object of the fulfillment request, the action(s) executed to fulfill the requirements of the fulfillment request, and/or some underlying operation(s)/product(s) impacted by the fulfillment request in some way) to ensure the services operate as desired/intended/creased; (4) correlating events that result from the monitoring of the services to the proper services; (5) computing the effects and actions for the events related to the monitored services; (6) determining manual and/or automated actions to test and remediate affected services; and (7) executing the manual and/or automated actions as fulfillment requests.

Accordingly, various embodiments of the present disclosure are directed to systems and methods that unify service assurance and service fulfillment. In practice, service assurance and service fulfillment systems operate in the context of a graph of inter-dependent services, and the corresponding configurations of physical and virtual resources onto physical infrastructure. A service fulfillment system creates the configurations while a service assurance system collects information regarding the correct functioning of the configurations and corresponding infrastructure hardware to detect and compute the effects of failures/degradations.

One aspect to achieving unity between service fulfillment and service assurance involves using a unified notation for specifying service fulfillment and service assurance regarding any component of a service. In some embodiments, a dynamic service descriptor (DSD) language may be used, but any language that allows for common notation to be used across service fulfillment and service assurance systems can be leveraged.

Another aspect to achieving unity between service fulfillment and service assurance involves the use of a unified service inventory that maintains all of the services and configurations a SP provides to its customers, along with a pre-determined graph of the dependencies that exist between services using the unified notation alluded to above.

Achieving unity between service fulfillment and service assurance may further involve a method of calculating dependencies between configuration parameters, event parameters, fact parameters, and trigger conditions, as well as respective values of these parameters/conditions. Accordingly, the execution of triggers/trigger events when defined trigger conditions are met/arise "close the loop." In other words, the execution of triggers is performed using service fulfillment operations (hence, closing the loop between service assurance and service fulfillment) while ensuring that no duplicate actions are performed.

FIG. 1 illustrates an example SP workflow 100 that is representative of actions, operations, events, etc. that may occur in the context of service fulfillment and service assurance. The term "service" as utilized herein, can refer to the orchestration of changes in a (often complex) system of interactive services, networks, and systems for the creation of communication services or products. In other words, a service can be a conceptual placeholder for a "thing" that may be given meaning by the parameters, relationships, and/or potential actions involving or affecting the thing within the context of the SP workflow 100. For example, a service can be an entity, class, node, vertex, etc. Accordingly, in a traditional sense or example, a service can be some collection of actions that produce a desired result, but underlying that collection of actions are parameters, relationships, and/or potential actions impacting or involving one or more of the actions making up the collection of actions.

As illustrated in FIG. 1, services 102, e.g., a 5G breakout service, may involve certain physical and/or virtual resources implemented on infrastructure 104, such as servers, wireless local area network (WLAN) devices, e.g., access points, routers, etc. Following the 5G breakout service example, it should be understood that resources, like services, described above, can be, but is not limited to a components, aspects, objects, applications, or other elements that provide or act as a prerequisite to such element, e.g., another resource or service. For example, infrastructure 104 can include connections to/from one or more physical and/or virtual infrastructure, which can also be considered to be resources. In some embodiments, and as used in the descriptor notation/language, a resource can refer to a service that needs to be in an active state before another service can begin to be designed. Such services 102 can be provided to a customer 106 by a service provider 108 upon being provisioned through a service provisioning mechanism/process 110 and corresponding provisioning actions 110a in response to service requests 112 from, e.g., a customer relation management (CRM) layer. In particular, services may be defined (e.g., a service's appearance and/or how a service is built) in a catalog that may also reflect relationships between services (parent-child and/or linked relationships, inheritance relationships, etc.). It should be understood that services and services' structure can be maintained in a service inventory. Service requests 112 may include service data collection, service order validation, service order orchestration, service order tracking and/or management, and the like. Based on the building blocks that define a service (mathematically modeled using, e.g., the aforementioned DSD or similar language), the service resources may be activated. Accordingly, the services 102 may be specified as models 101.

As alluded to above, and following the example 5G breakout service, a 5G break-out service may be deployed on multiple premises of retail stores using a combination of hardware (e.g., servers, antennas, cables, WAN terminations), and virtualized network functions (VNFs). Such services may be used for intercepting various types of mobile traffic generated by customers and employees within the retail stores, and/or directing specific traffic to custom applications hosted by the enterprise or customers of the enterprise. Such services may also be part of an end-to-end service, providing functionalities such as data-reduction, analytics, remote monitoring and location-aware services used by the customers and employees. Such combined, multi-site, complex services are traditionally hard to deploy, maintain and monitor. Another service example may be a classical cloud-like service offering, but combined with network service offerings, such as different security zones (customer, employee, legal, etc.) combined with firewalling, routing configurations, and extensions to end-customer premises. Within such services, service objects would represent the customer-orders, constituent physical and components, networks, applications, configuration items, aggregations and/or relationships of all of these elements.

Any issues or problems that exist or may arise regarding any service(s) may be identified through the collection of events 114 from the physical and/or virtual resources implemented on infrastructure 104. A service impact analysis may be performed to determine a service's status 116, and service provider 108 may be informed of any such issues/problems. Resolution of such service issues/problems can be automated via closed loop processing 118 that are realized with closed loop actions 118a, and "healing" processes may be triggered. As will be described in greater detail below, a change/update to service parameters may be triggered, and executed by a dynamic descriptor engine.

Figure 2:
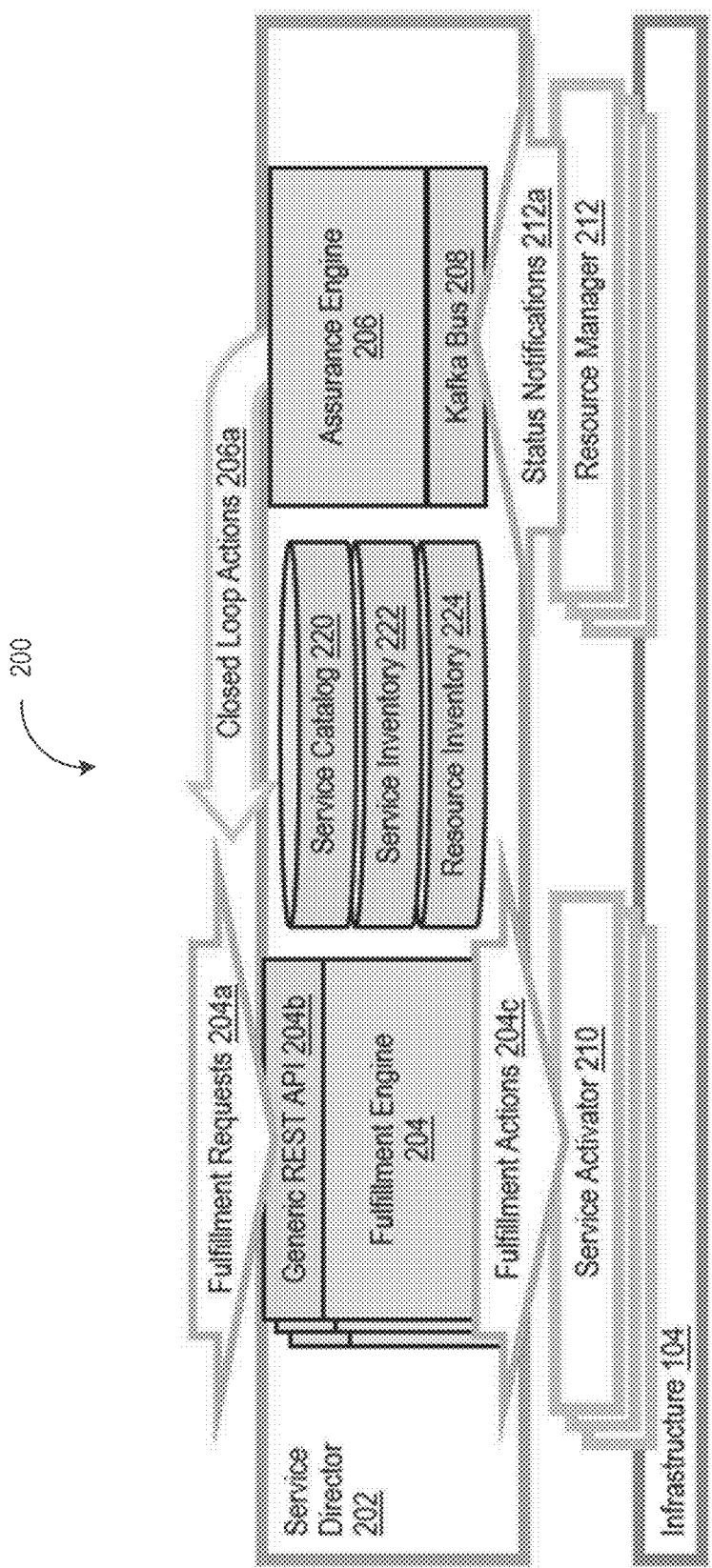
FIG. 2 illustrates an example SP system architecture in accordance with one embodiment of the disclosed technology.

FIG. 2 is a schematic representation of a SP system architecture 200 that includes service fulfillment and service assurance functionality. A service director 202 may refer to a model-based orchestration engine for managed hybrid services. Service director 202 may, in some embodiments, comprise a service fulfillment engine 204 and a service assurance engine 206. In accordance with various embodiments, and as alluded to above, through the use of a unified descriptor language understandable and useable by both service fulfillment engine 204 and service assurance engine 206, a closed loop framework or mechanism for addressing both service fulfillment and assurance can be realized. That is, and as alluded to above, service-level issues, problems, etc. can be addressed automatically by service fulfillment actions. In other words, the same mechanism (service fulfillment engine 204) used to provision/fulfill service requests can be used to solve service incidents identified by, and as instructed by service assurance engine 206. Moreover, as can be appreciated from FIG. 2, that a single service inventory 222 is implemented (as well as a single service catalog 220 and a single resource inventory 224) between service fulfillment engine 204 and service assurance engine 206.

For example, fulfillment (service) requests 204a may be received by service director 202 via a RESTFUL application programming interface (API) 204b. Service fulfillment engine 204 may perform various fulfillment (service provisioning) actions. In particular, service fulfillment engine 204 may define services through mathematical models and store these service definitions in a service catalog 220, which may be a database, database partition, or other data repository. Moreover, service fulfillment engine 204 may orchestrate service instantiation based on defined rules and policies. As a result of such service instantiation by service fulfillment engine 204, a service inventory 222 can be automatically populated. It should be understood that service inventory 222, like service catalog 220, may be a database, database partition, or other data repository. Service inventory 222 can contain versions products, services, and/or resources as defined in the service catalog 220, while a resource inventory 224 may contain information regarding resources (e.g., elements of infrastructure 104) that can be leveraged to provide services. A service activator 210 may implement or carry out execution of the fulfillment actions 204c (i.e., executing commands regarding service provisioning) on the requisite resources comprising infrastructure 104.

Once a service(s) is instantiated and operational for a SP, from the service assurance perspective, a resource manager 212 may perform, e.g., resource monitoring on the physically and/or virtually-implemented resources, and status notifications 212a (e.g., events) can be collected and distributed to an enterprise service bus, or similar integration system. In this embodiment, a Kafka bus 208 may be used. As would be understood by those skilled in the art, Kafka refers to Apache Kafka, an open-source stream-processing software platform, generally leveraged for handling real-time data feeds.

Resource inventory 224 may comprise a data repository in which records including physical, logical, and/or virtual resources that are available to be used to implement a particular service(s). For example, resource inventory 224 may maintain information regarding infrastructure elements on which virtualized resources may be instantiated to realize a requested service that service fulfillment engine 204 seeks to fulfill/provision.

While logical and virtual resources are discussed, it is to be understood that these will ultimately, e.g., at a low level of implementation detail, be implemented using physical computing, storage or network, i.e. hardware, resources. For example, a network function virtualization infrastructure may comprise virtual computing (e.g., processor), virtual storage (e.g., hard disk) and virtual network (e.g., virtual network interface controllers) resources implemented on a virtualization layer (e.g., implemented by one or more hypervisors or virtual machine monitors). The virtualization layer may then operate on hardware resources such as processor devices, storage devices and physical network devices, for example as provided by one or more server computer devices.

The resource manager 212, together with the resources defined in resource inventory 224, provide entity-action building blocks based on a physical and/or virtual infrastructure 104 that may be combined in the form of a descriptor to enable the provisioning of a service. Service fulfillment engine 204, as alluded to above, performs the requisite orchestration to provide the desired network function virtualization, while resource manager 212 determines how to orchestrate the resources for supporting the desired network function virtualization.

In FIG. 2, a Kafka bus 208 may be used for messaging, storage, and processing of any events, i.e., occurrences in the SP's system and/or the status notifications arising from the resource monitoring of the services provisioned by the service fulfillment side of service director 202 as a result of such occurrences, which can include lost communications, lost service, resource failures, service quality level falling below a threshold, etc. Service assurance engine 206, upon receiving such status notifications regarding service and/or resource issues can determine how the service and/or resource can be healed by addressing the issues (described in greater detail below). Service assurance engine 206 may send closed loop actions 206a (described above) to the fulfillment engine 204, effectuating a closed loop, so that fulfillment engine 204 can carry out the necessary actions to achieve the requisite service assurance.

Figure 3:
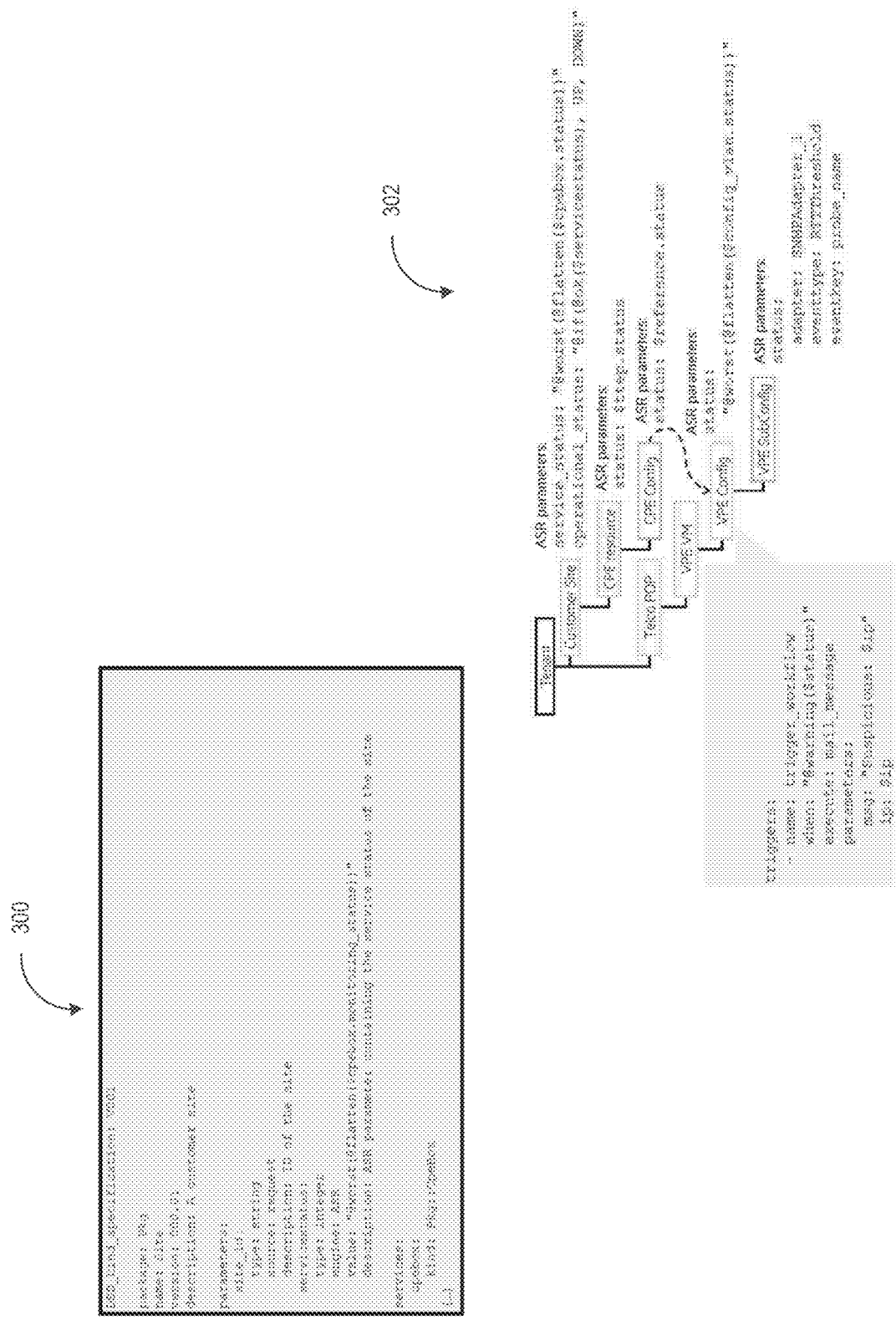
FIG. 3 illustrates an example of a unified notation utilized in accordance with one embodiment of the disclosed technology.

FIG. 3 illustrates an example of a descriptor 300 used to define a service object in accordance with various embodiments. That is, a service can be provisioned through the use of "descriptors," in particular a "service descriptor" for the service and descriptors for any entities associated with the service. It should be understood that descriptors can refer to a configuration or piece of a configuration that describes/defines a thing, e.g., descriptors can be defined in terms of information content, and/or as mappings explaining how to write the same information in/using different notations, e.g., between Extended Markup Language (XML), Yang, TOSCA, etc. As used in some embodiments herein, the term descriptor can be used interchangeably with the term "service descriptor," i.e., when a descriptor is used to describe/specify a service. As can be appreciated from the above description, these entities may be sub-services, physical, logical and/or virtual network functions, physical, logical and/or virtual network components; place-keeper entities; infrastructure resources such as physical computing, storage and networking resources; and networks. Descriptors are data structures that declaratively define the properties of the service and/or entity. As used herein, the term "provisioning" is used broadly to cover at least the creation, modification and deletion of a service, e.g. as a synonym for service fulfillment in a telecommunications context. For example, a service may be provisioned in response to a request to create, modify or delete a particular service, e.g., a service request 112 (FIG. 1)/fulfillment request received by fulfillment engine 204 (FIG. 2). This may also involve requests to add, modify or delete one or more r sub-services. For example, a fulfillment request may be received to provision a service, e.g., a service command, where the command can be translated into a sequence of fulfillment actions to be performed on underlying physical, logical and virtual infrastructure 104.

This translation is achieved by way of the service descriptors. Again, these service descriptors can be thought of as data structures representative of a service by using a set of parameters, i.e., a data type used to describe a type of service, and roles governing that service. The one or more parameters making up a descriptor can define the policies by which the service should be implemented, and the parameters themselves can be provided in a format understandable to, in accordance with various embodiments, the service fulfillment engine 204 and the service assurance engine 206. The values of these parameters are assigned to generate a particular instance of the service that may be implemented on said infrastructure. To manage transitions a service descriptor data structure may reference entities such as other sub-services, for example particular virtual network functions or combinations of virtual network functions, each of these again being represented by a service descriptor.

Service descriptors provide a convenient, modular description of services in terms of the types of subservices, physical and/or virtual functions/network components, and corresponding infrastructure components, e.g., physical/virtual storage, networking facilities-end computing resources, and rules governing those components to instantiate, modify or delete a particular service. In certain examples described herein, descriptors are used to declaratively define one or more desired parameters of a service in terms of other parameters, subcomponents, and also the relations between the service and other services provided by the service provider. In some examples, the underlying virtual resources provided by a service provider are virtual network functions (VNF) managed by a VNF management system. For example, a VNF management system can provide the capabilities for creating virtual machines (VMs), virtual networks, virtual containers, etc., or connecting virtual Network Interface Cards (vNICs) for example. In certain examples, a highly complex arrangement of a very large number of such components is used to implement a service. The service descriptor provides a way of breaking down a complex service into composable subservices which each have their own descriptors. Instantiations of services may decompose into hierarchies of parent and child services where, for example, individual components instantiated by a service controller such as a VNF management system are represented at the lowest level of the hierarchy. Thus, descriptors may provide a construct which abstracts much of the configuration of underlying physical/virtual components but which is used to define the types of entities used to orchestrate those components to instantiate, modify or delete the service using decomposition.

For example, a service descriptor may define which child entities an instance of that service descriptor may have. A service descriptor may further define how parameter values are passed from a parent entity to its child entities (in a process referred to as decomposition), thereby allowing parent and child entities to be quickly deployed. An instance may also, when prescribed by a service descriptor, reference instances other than the parent. In these cases, the service descriptor may also define parameter values to be passed between the referrer and the referenced instance. Descriptors may therefore, provide data objects that enable system configurations and topologies to be represented, independently of concrete infrastructure configurations. For example, parent and child entities may be defined using a tree structure to model the parent-child relationship. Use of references as described herein expand this relationship to enable entities to form relationships that may be modelled as a directed, acyclic graph.

Referring back to FIG. 2, and in the context of service descriptors, service fulfillment engine 204 may receive a command to provision a service. In response, service fulfillment engine 204 accesses one or more service descriptors associated with the service to be provisioned, and obtains instances of these service descriptors to activate the service, i.e., fulfill an action. In this case an "instance" can refer to an implementation of a service descriptor where parameters specified in the service descriptor are assigned values, e.g. a meaning consistent with its use in object-oriented programming. Similarly, the term "instantiating" as used herein refers to generating an instance, consistent with its use in computer science. One or more instances may be instantiated from a single service descriptor. In certain cases, this may involve a state transition process that involves reserving, provisioning and activating one or more virtual network functions that make up the service. Further still, service fulfillment engine 204 may instruct the assignment of physical computer resources, e.g. server computer devices, to implement the virtual network functions, e.g. in the form of virtual machines running on such server computer devices.

Referring again to FIG. 3, an example service descriptor 300 is illustrated. In this example, and in accordance with the above description, service descriptor 300 may include information identifying a group of specifications to which service descriptor 300 belongs, versioning information, object type information, parameter information, e.g., a declaration of input parameter groups and order, a declaration of parameter policies relevant to the declared input parameter groups, policies for user-requested child services, service status information, etc.

Again, conventional service assurance systems operate in isolation from conventional service fulfillment systems in from a notation perspective. That is, any polices or rules set forth by a conventional service assurance system are specified separately from and using a notation different from the rules and notations used by a conventional service fulfillment system. Moreover, the policies and/or rules specified by a conventional service assurance system may be unable to leverage the information and/or dependencies regarding services set forth by a corresponding, conventional service fulfillment system. This is despite the fact that a corrective action (taken by a service assurance system to assure some desired level of service quality) is by nature, a fulfillment action inasmuch as it would, e.g., occur in response to a request, require provisioning/orchestration, specifying of applicable resources, etc. It should be understood that regarding service quality, SPs may endeavor to provide a particular service(s) that experience some minimum threshold of downtime, that provide some action(s) within a specified amount of time, that meet or exceed customer satisfaction expectations, etc. In some cases, numerical definitions of a pre-defined service quality can be set forth, for example, as follows: a "−1" or "0 for unknown service quality; "1" for OK service quality; "2" for a service quality warning; "3" for a minor service quality issue; "4" for a major service quality issue; and "5" for a critical service quality issue. Some SPs may associate or quantify service quality in terms of a code, a number (as described previously), a performance threshold, and the like.

As illustrated in FIG. 3, with a unified language/notation approach, the same language/notations used in service fulfillment (e.g., a service descriptor 300) can be used for service assurance, where assurance parameters 302 reflect and/or reference the same service descriptor information used to specify a service object. For example, service descriptor 300 specifies service status "servicestatus" by indicating a service type, and referencing the service assurance engine (service assurance engine 206), i.e., "ASR." Additionally, the service descriptor 300 specifies a service status value ""@worst(@flatten($config_vlan.status))"," and a corresponding description "ASR parameter containing the service status of the site." As is described above, service assurance engine 206 receives resource monitoring information from resource manager 212, e.g., monitored event information that may reflect issues/problems with a particular service(s) provisioned by service fulfillment engine 204. Thus, the service descriptor defining a particular service can include a reference to a service assurance parameter allowing any service assurance closed loop action to be fulfilled by service fulfillment engine as a fulfillment action 204, easily and efficiently. In other words, modeling of a service can be used to drive service assurance behavior.

It should be noted that addition of the attribute alluded to above, "engine: ASR" informs service director 202 the following expression should be computed by service assurance engine 206 (rather than service fulfillment engine 204). In this way, the expression language for assurance parameters 302 becomes the same as that for the fulfillment parameters. It should also be noted that at load-time of service catalog 220, service director 202 may automatically compute a graph of dependencies between parameters so that the service director 202 is able to infer which parameters specified in which services are to be loaded into service assurance engine 206. This parameter dependency graph can refer to a representation of parameter "buckets" in which values can be stored and/or computed (see FIG. 5). In some embodiments, the parameter dependency graph can be derived from a service graph (described below). As will be described below, information fetched from, e.g., service inventory 222, into service assurance engine 206 is an efficient process in that only a small percentage of services, and accordingly, a small percentage of parameters in those services are required for assurance computations. Although not meant to be limiting, in some contexts, a small percentage can be, e.g., ten percent. That is, only ten percent of the total number of services may be fetched (i.e., only those services with any relation to service assurance), and within each of these services, ten percent of the parameters are fetched.

For example, the service status and operational status determined by service assurance engine 206 can be reflected in the ASR parameter that, as described above, is referenced in the service descriptor 300 for that service. Regarding events, ASR parameters representative of events that may be detected by resource manager 212 can be specified in a manner that correlated those events to services using an "adapter." For example, an ASR parameter adapter "SNMPAdapter_1" can be specified (where SNMP refers to the Simple Network Management Protocol generally used for collecting and organizing information about managed devices on IP networks). Attributes associated with the ASR parameter adapter may also be specified, in this example, ""eventtype: RTTThreshold"," and ""eventkey: probe_name"." It should be understood that the adapter parameter can refer to a "fact-parameter," whereas the eventtype and eventkey parameters can refer to "event-parameters," that contain dynamically-computed meta-attributes used for correlating status notification events (received as a result of resource monitoring performed by resource manager 212) to ASR-engine parameter values in service assurance engine 206.

As noted above, triggers/trigger events may be executed when defined trigger conditions are met/arise. Accordingly, assurance parameters 302 may also specify trigger-relevant information so that resource manager 212 can watch or monitor the condition of a service or resource via ASR parameter-specified conditions through such triggers, and appropriate healing actions can be taken. For example, as illustrated in FIG. 3, triggers can be specified by name "trigger_workflow," a trigger condition, e.g., threshold, timing, etc. regarding the occurrence of a particular state ""@warning($status)"," along with an action to be executed "mail_message." Relevant parameter information may include the contents of, in this example, executing the transmission of a mail message notifying a receiving party of a suspicious event along with an IP address associated with that occurrence, ""Suspicious: $ip"," and "ip: $ip." Also illustrated in FIG. 3 are the names/identifiers of the particular descriptor expressions, e.g., "Tenant" can denote the owner of the described services, "Customer Site" can identify the site of the SP at which the described services can be/are implemented, and so on. The names/identifiers can refer to particular classes or types of services. Again, the assurance parameters 302 (to the right of the names/identifiers) can express assurance aspects. It should be noted that service graphs and the parameters used for representing a service are computed by fulfillment engine 204. It is assumed that the service assurance side of SP system architecture 200 does not modify a service graph. Service graph modification is accomplished by the service fulfillment side of SP system architecture 200. This assumption facilitates computation of the aforementioned parameter dependency graph. That is, on the service fulfillment side, the parameter dependency graph may change on the fly, and parameters can be introduced or removed during computation. This can result in relatively complex and time consuming processing for the fulfillment side of SP system architecture 200. However, by assuming that the service assurance side sees only an intermittently static service graph, the parameter dependency graph can be statically computed, and re-used for many event-propagation cycles. It should be understood that a service may change much more slowly (e.g., ten to ten thousand times slower) than the appearance of any events. Accordingly, the same fetch, and hence the service and parameter-graphs can be re-used that many times by assurance engine 206 before it has to be re-computed.

As noted above, the implementation of a unified service fulfillment and service assurance system may be premised on a unified language useable by both the service fulfillment and service assurance aspects of a SP's system, e.g., service fulfillment engine 204 and service assurance engine 206 (of FIG. 2). Although embodiments herein are described using a dynamic service descriptor language/notation, it should be understood that other languages, notation, or schema for defining the behavior of a service object may be used so long as the unity between service fulfillment and service assurance described above can be maintained.

Figure 4:
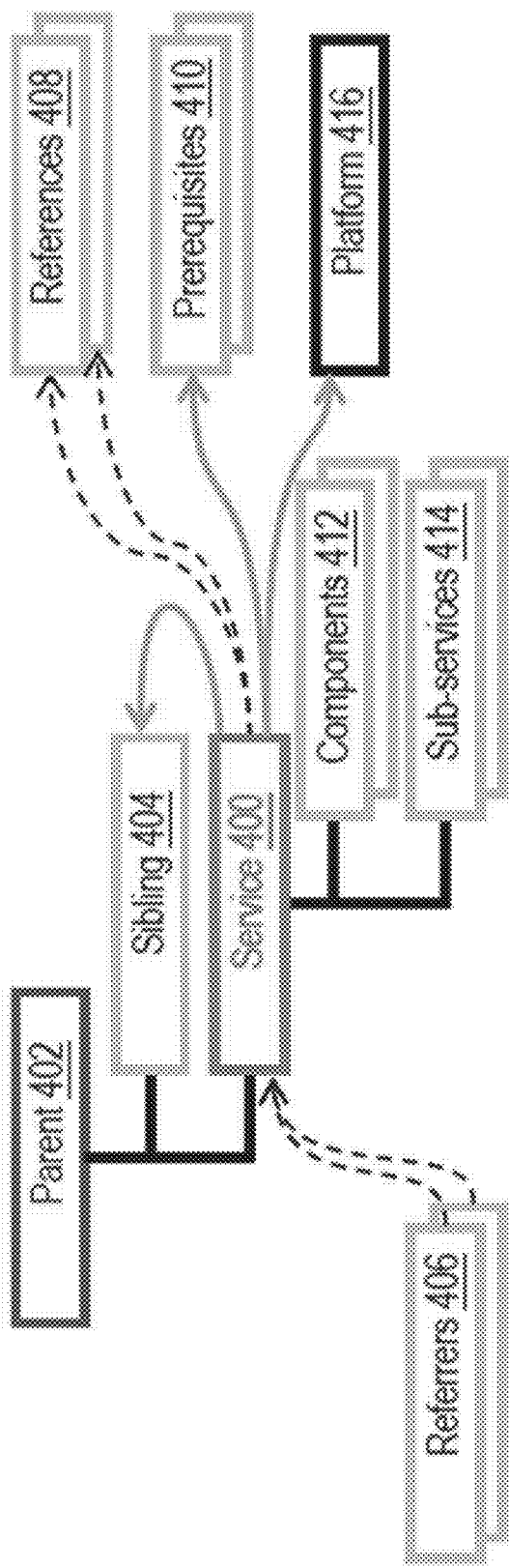
FIG. 4 is a schematic representation of example service relationships in accordance with one embodiment of the disclosed technology.

FIG. 4 is an example representation of service relationships according to one or more embodiments is shown. FIG. 4 illustrates an example service 400 along with the different types of relationships involving a service, such as service 400. For example, FIG. 4 reflects relationships including, but not limited to relationships regarding or involving a parent, a sibling(s), a referrer(s), a reference(s), a prerequisite(s), and the like. The arrows illustrated in FIG. 4 may represent the relationship of a given service, e.g., service 400 to other services. For example, there may a parent service 402 to service 400. There may also be a sibling service 404 related to service 400, wherein sibling service 404 may also have a relationship as a child to parent service 402. Defining the relationships between the services allows the order in which particulars services may be completed to be graphically represented. In this example, service 400 may have to wait for parent service 402 to complete before it may begin. Sibling service 404 may also have to wait for parent service 402 to complete before it begins. However, sibling service 404 may execute at the same time as service 400. Additional services may include referrers 406 to given service 400, as well as reference services 408, and any number of prerequisite services 410 to service 400. Also represented via relationships, are components 412 making up service 400, sub-services 412 making up service 400, and a platform(s) 416 (e.g., resource/infrastructure) on which service 400 may be implemented.

Depending on the type of relationship, a set of dependency rules may be applied to the different types of relationships to create, e.g., inter-service dependencies. For example, if a user requests a shared storage facility which was a service instantiated by a SP in response to a request from another user, the service descriptor of the requested service 400 may include a reference (e.g., reference 408) to the shared storage service. One or more parameters of the requested service 400 define how attributes of the service 400 are to be computed. These attributes can depend on the attributes of the referenced shared storage service. Attributes of the requested service 400 can be re-computed based on the parameters in the descriptor of the requested service 400, in response to a modification to attributes of the shared storage service.

In some examples, the service request specifies that the storage service additionally be configured to be compatible with the other subservices which form their service request. This can be included in the service descriptor as part of the specification of one or more parameters. Similarly, the requesting service 400 can be represented in the service descriptor of the shared storage service as one or more referring parameters (referrer 406). For example, one attribute of the shared storage service is the capacity being used by a user service which refers to the shared storage service. If the attribute changes at the user's service referring to the shared storage service, one or more attributes of the shared storage service may be recomputed to propagate the attribute changed in response to the user's request. Furthermore the other services using the shared storage service will have attributes which depend on the attributes of the shared storage service. Hence, changes may be propagated to other attributes of services in the service graph.

As noted above, defining and having awareness of such relationship allows development of an orchestration plan (e.g., by service fulfillment engine 204) from a directed, acyclic, service graph. In the present context, a "graph" may refer to a collection of nodes representing services, and arcs representing relationships between those services. A graph may include many types of nodes and arcs. A service graph may comprise the relationships between different services and subservices of those services. In some examples, nodes of the service graph are services or subservices which correspond to entitles instantiated on a SP's physical and/or virtual infrastructure which have one or more inter-relations with one another in the manner described above according to the descriptors of the services. In a simple hierarchical service structure, the service graph may be, an acyclic directed tree comprising parent and child services. However, in general, where services form complex inter-relationships comprising referencing and referenced services the service graph forms an arbitrary directed graph. When a service request for a new service is received by the SP, the SP reviews existing services which are currently provisioned on their infrastructure and in response, and activates the entities for providing the service to that user. In some examples, the service is instantiated from existing components and sub-services to fulfill the request.

As a result of service graphs being developed for services, currently existing SP-provided services, configurations, and dependencies between different services, resources, etc. can be maintained in a unified inventory. That is, unlike conventional service fulfillment and service assurance implementations that rely on disparate notations, definitions, rules, policies, etc., service fulfillment engine 204 and service assurance engine 206 are able to share the same service catalog 220, service inventory 22, and resource inventory 224. In this way, a SP's system is able to operate with increased speed and efficiency over conventional SP systems, and the aforementioned goal of closing the loop can be realized.

Figure 5:
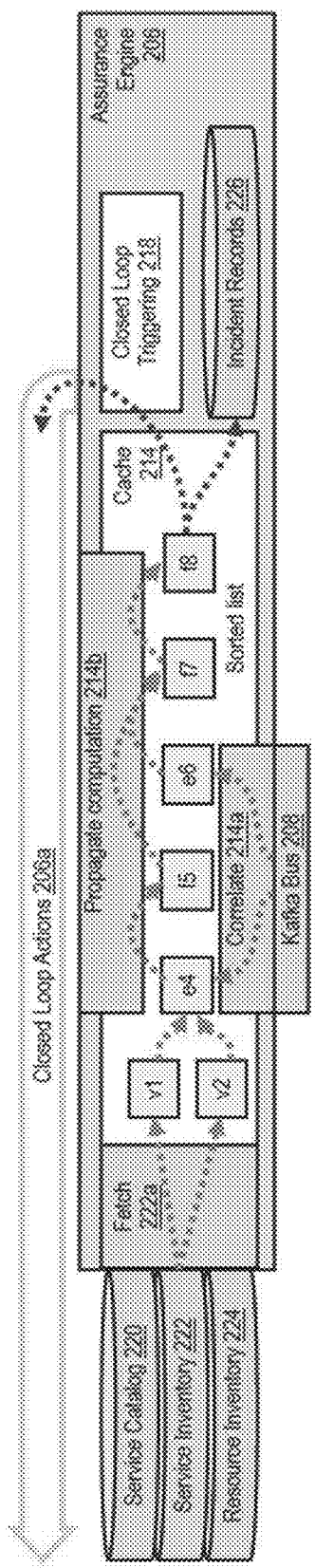
FIG. 5 illustrates an example of parameter computation in accordance with in accordance with one embodiment of the disclosed technology.
Figure 6:
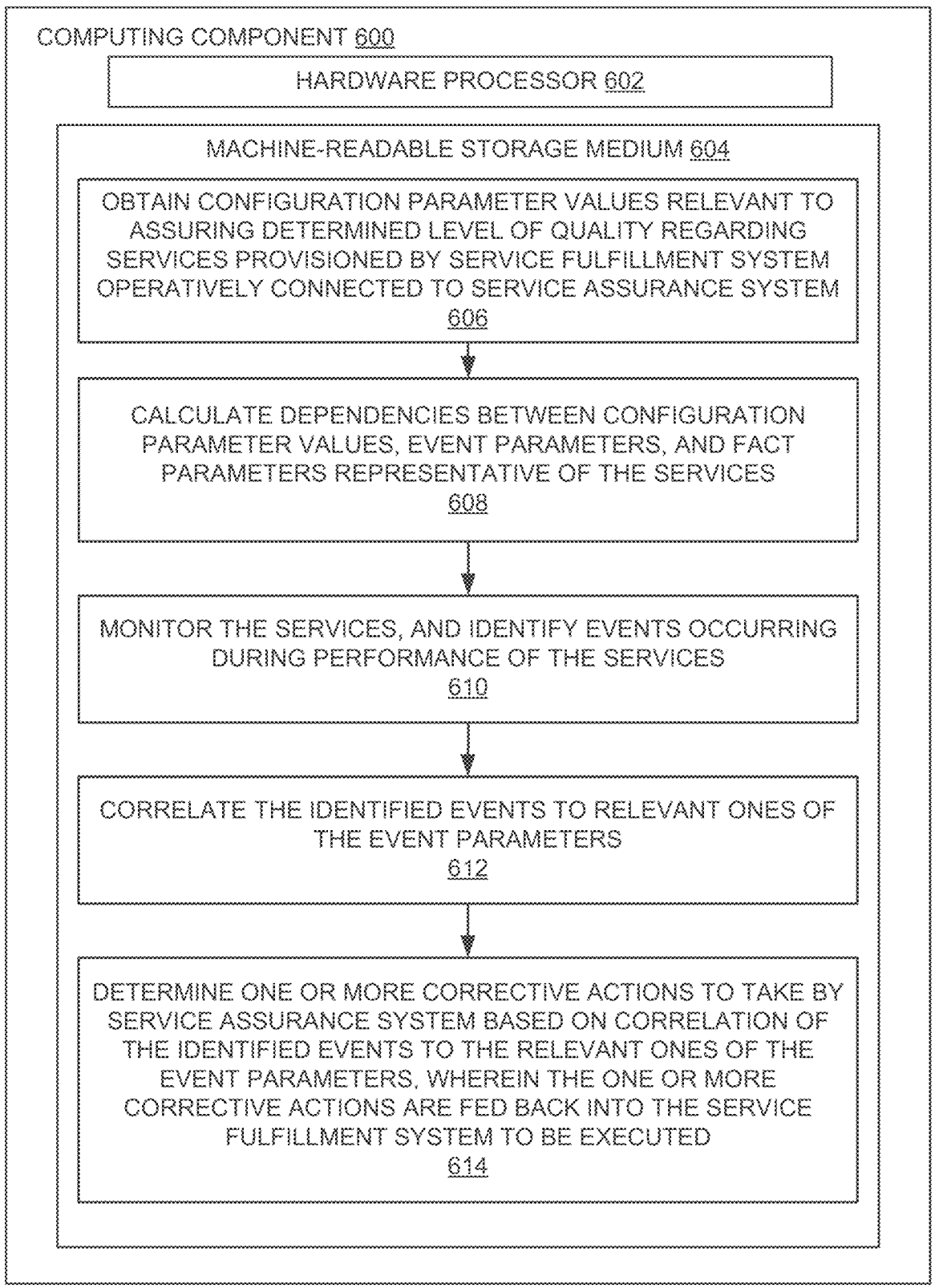
FIG. 6 illustrates an example computing component capable of executing instructions for effectuating unified service fulfillment and service assurance in accordance with one embodiment of the disclosed technology.

FIG. 5 illustrates example aspects of, and example operations performed by a service assurance engine in accordance with various embodiments, such as service assurance engine 206. FIG. 5 will be described in conjunction with FIG. 6. FIG. 6 is a block diagram of an example computing component or device 600 for performing service assurance functions in accordance with one embodiment. Computing component 600 may be, for example, a server computer, a controller, or any other similar computing component capable of processing data, and realizing the functionality of an assurance engine. In the example implementation of FIG. 6, computing component 600 includes a hardware processor 602, and machine-readable storage medium 604. In some embodiments, computing component 600 may be an embodiment of a processor.

Hardware processor 602 may be one or more central processing units (CPUs), semiconductor-based microprocessors, and/or other hardware devices suitable for retrieval and execution of instructions stored in machine-readable storage medium, 604. Hardware processor 602 may fetch, decode, and execute instructions, such as instructions 606-6012, to control processes or operations for computing parameter dependencies in accordance with one embodiment. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 604 may be a non-transitory storage medium, where the term "non-transitory" does not encompass transitory propagating signals. As described in detail below, machine-readable storage medium 604 may be encoded with executable instructions, for example, instructions 606-614. Hardware processor 602 may execute instruction 606 to obtain configuration parameter values relevant to assuring a determined level of quality regarding services configured by a service fulfillment system operatively connected to the service assurance system. As noted above, SPs may endeavor to provide a certain level(s) of quality regarding the service(s) they provide to customers, and thus, a service(s) may be configured to operate in a way that provides the desired level(s) of quality. Configuration parameters may be used to specify/characterize such configurations, and configuration parameter values may be values that allow practical implementation of those configuration parameters. Examples of configuration parameters may include, but are not limited to parameters regarding service identification, service type, creation and modification dates, order identification, contract reference, universally unique identifiers (UUIDs), pre-provisioned status, administrative state, additional text, etc. Other configuration parameters may be used for correctly identifying a failing entity, for example: a server, virtual machine or container (e.g., management IP address, http-port); an assigned physical entity (e.g., location, row, rack, shelf, slot, port-number,); an application (e.g. location, application name, IP address, http-port); a network (e.g., domain, subnet, VLAN ID); a related element management system; and connectivity and authentication information.

Still other configuration parameters may include parameters for correctly determining the required service quality as specified by the customer for the service, e.g., a service level (Best-effort, Bronze, Silver, Gold); size (small, medium, large,); customer type (residential, small business, medium enterprise, large enterprise); or error-handling policy. Any other parameter(s) known to the fulfillment system (e.g., service fulfillment engine 204) deemed relevant by a designer of a service, including but not limited to parameters determining properties regarding protection circuits, redundancy, scale-out factor, high-availability configuration, contact information, etc. may fall under the rubric of configuration parameters.

That is, at startup of service director 202, all fulfillment parameter values, v (and in this example embodied as "v1" and "v2") relevant to service assurance are fetched into a service assurance cache 214. As noted above, service fulfillment engine 204 may manage orchestration of services, service provisioning, etc. Accordingly, service fulfillment engine 204 may, in the process of service orchestration and provisioning, develop service configuration parameters, which can be stored in service inventory 222. Because of the unified manner of operation between service fulfillment engine 204 and service assurance engine 206 (including the unified notation described above), assurance engine 206 may fetch the requisite parameter values to assure service quality from the same service inventory 222 used by service fulfillment engine 204 to store its service configuration parameters.

Within service assurance cache 214, placeholder "buckets" can be created to hold event-parameters, e, and fact-parameters, f, which as described above, have been introduced into the unified notation/language to allow for event correlation (described below). As illustrated in FIG. 5, event-parameters e4, e6 and fact-parameters f5, f7, and f8 have been retrieved from service inventory 222 and placed in service assurance cache 214. Fact-parameters, on the other hand, may be derived by evaluating expressions that define how to compute aggregate and derived information gleaned from the service graphs defining each of the services and their respective relationships and dependencies. Thus, any event-parameters and fact-parameters held in service assurance cache 214 reflect any service dependencies, referrers, parents, children, etc. as defined by a service graph/service descriptors (described above).

As illustrated in FIG. 5, values can be put into these buckets by either fetching 222a from service inventory 222, correlation 214a from events, or from computation 214b by expressions in the relevant descriptors. The parameter dependency graph itself may be constructed by analyzing each expression in the relevant descriptor to see what other parameters the expression refers to. For example, a parameter "a" may be defined as follows:

a: {type: integer, value: "@sum($b, $s.c)", engine: ASR}

That is, the value of "a" is computed by adding the value of "b" to the value of "c" in the service contained in the parameter called "s." Hence, the value of "a" depends on the values of three other parameters in this example, i.e., "b," "s," and "c." As represented in a parameter dependency graph, "a" will have arcs (dependencies) on "b," "s," and "c." In this example, "s" is a reference to another service in the service graph that was computed during service fulfillment, and the value of "s" therefore came from fetching 222a values from service inventory 222. The values for "b" and "c" could have come from any of the three aforementioned parameter value sources (fetching 222a, correlation 214a, computation 214b).

Hardware processor 602 may execute instruction 608 to calculate dependencies between the configuration parameter values, event parameters, and fact parameters representative of the services. That is, and as illustrated in FIG. 5, the event-parameters and the fact-parameters can be topologically sorted into a list so that expressions in the parameters depend on parameter values earlier in the list. In some embodiments, an algorithm, such as Tarjan's algorithm may be used to find strongly connected components of a directed graph. In this way, the placing of event-parameters and fact-parameters into the placeholder buckets (as well as incremental fetching of parameter values at longer intervals for synchronizing with changes resulting from service fulfillment) can be done in linear-time. Thus, any cyclic dependencies that occur between parameters can be detected, and in turn, the cycle can be broken, and a warning notification can be triggered. It should be understood that in some embodiments, this calculation happens when a service topology changes (which as described above, may occur, e.g., ten to ten thousand times more slowly that the arrival of events (due to resource monitoring). Hence, and as described above, computation cycles need not waste time on parameter dependencies, but rather run on a semi-static linear list of parameter value buckets. In other words, placeholder buckets are created in the event service topology changes, but other remain until a subsequent service topology change. It should also be understood that cache 214 can refer to an in-memory structure containing the event and fact parameters.

It should be noted that for consistency/redundancy purposes, at startup, an image of events that were in existence prior to shutdown can be re-established in the event-parameter and fact-parameter buckets. In this way, service assurance engine 206 may have to opportunity to address any existing issues.

Hardware processor 602 may execute instruction 610 to monitor the services, and identify events occurring during performance of the services. As described above, resource manager 212 may monitor resources and provide status notifications including any events to service assurance engine 206 by way of an enterprise service bus, which in this case is a Kafka bus 208.

Again, annotating parameters can be used for service fulfillment or service assurance allowing information to be derived therefrom. Accordingly, service director 202 is able to automatically derive how expressions regarding service assurance facts (computed values) refer to fulfillment parameters, i.e., fact-parameters. In this way, service assurance engine 206 uses as little computer memory as possible in operation, by foregoing the need to load into memory, those service fulfillment parameters that are not referenced by any service assurance parameters. Moreover, service assurance engine 206 is able to compute and topologically sort service assurance parameters (described above) by their dependencies. In this way, when an event occurs, the evaluation of dependent fact-parameter expressions can be performed relatively quickly. This is because the dependencies between the event-parameters and fact-parameters have, as described above, already been computed or pre-computed. The speed at which service assurance engine 206 operates can be important because the rate of arrival of can be very high, i.e., on the order of thousands per second.

Hardware processor 602 may execute instruction 612 to correlate the identified events to relevant ones of the event parameters. Referring back to FIG. 2, service activator 210 may implement or carry out execution of the fulfillment actions 204c (i.e., executing commands regarding service provisioning) on the requisite resources comprising infrastructure 104. Resource monitor 212, on the other hand, monitors the services running on/involving infrastructure 104. It should be understood that although a single resource monitor 212 is described/illustrated, there may be a plurality of monitors (e.g., software-implemented monitors) that perform this monitoring. Thus, workflows of service activator 210 are related to the resource monitoring performed by resource manager 212, and this association allows service fulfillment engine 204 to configure resource manager 212 whenever a new service is to be monitored. In this way, resource manager 212 may annotate events that are passed up through Kafka bus 208 with sufficient information to allow identification of the service(s) that the events pertain to.

For example, and referring back to FIG. 3, the values for the "adapter," "eventtype," and "eventkey" assurance parameters are attributes that arrive with each event, and which can be combined to create a key that identifies the correct event parameter bucket in which to place/store/associate an event value. This can be done using a constant-time lookup table (hash map) to effectuate fast correlation (e.g., less than 1 ms per lookup). The fact-parameter computation can be performed going from the left to right through the sorted list in service assurance cache 214. Fact-expressions can be evaluated/calculated to return values (given actual values for the parameters that occur in those fact-expressions) that may be placed in their respective placeholder buckets, detecting incidents, and determining closed loop events to be triggered. Again, because the placeholder buckets of event-parameters and fact-parameters is a sorted list according to dependency, computation from left to right logically follows the order of dependencies. It should be noted that the above cycle of event collection, correlation to event-parameters, and evaluation/computation of fact-parameters can be repeated at a configurable interval (typically on the order of minutes).

An incident records repository 226 may contain information regarding incidents (e.g., problematic events or issues defined in standard IT service management) that require manual inspection and/or attention. Support personnel, e.g., system administrators, customer service representatives, etc. may access the incident records repository 226 via some user interface(s) to review the information regarding incidents, test various possible remediation action, etc.

Hardware processor 602 may further execute instruction 614 to determine one or more corrective actions to take by the service assurance system based on the correlation of the identified events to the relevant ones of the event parameters, wherein the one or more corrective actions are fed back into the service fulfillment system to be executed. In some embodiments, corrective actions can refer to operations performed or executed by service fulfillment engine 204 (or service personnel) in response to service fulfillment engine 204 commands or instructions to heal or otherwise correct/address an incident regarding a service instance. Examples of corrective actions may include, but are not limited to, for a virtual machine, performing a reboot, re-creating the virtual machine from scratch, moving the virtual machine to an alternative location, enabling a standby service, etc. In the case of, e.g., a physical resource failing or experiencing an issue, a corrective action may be to transmit an email or ticket to a repair team. It should be noted that declarative trigger policy expressions using the descriptor notation/language can be used to generate the (closed-loop) corrective actions. Moreover, trigger conditions can define when to execute (manually or automatically) corrective actions based on the trigger policy expressions that can be drawn from the information found/gleaned from the event-parameters and fact-parameters. To avoid overloading service fulfillment engine 204, the number of concurrently-executing operations may be limited, while taking into account that triggering conditions may change asynchronously in fetch and compute cycles while operations are waiting in queue.

It should be noted that overloading of service fulfillment engine 204 may be prevented by using a timeout cache that automatically collates identical corrective actions into single trigger calls. Trigger calls may, in principle, comprise hash keys designed such that they become identical if they refer to/are the same trigger call. In some embodiments multiple levels can be implemented, e.g., a first level timeout cache that may be implemented directly within a memory of service assurance engine 206, and a second level timeout cache that enables correlation between service assurance engine 206 and service fulfillment engine 204. For example, a trigger call can be identified by a "transactionid," and a second trigger call with the same transactionid as a previous one may be automatically correlated to the previous request, and the second trigger call will effectuate a response. The latter (second level) timeout cache implementation can be useful in scenarios where a system restart has occurred, and it is unknown whether a trigger call was previously sent prior to the system restart and/or received by service fulfillment engine 204.

The execution of triggers (in other words, closed loop remediation) using operations defined by the service fulfillment engine 204 may further be subject to hashing operations and/or associated parameters together with a timestamp. Hashing already executed operations can reveal if a trigger/corrective action has already been executed/performed. In this way, various embodiments can ensure that the same operation is not executed more than once (even when multiple policies may cause the same trigger to be enabled, and even if some trigger conditions may "toggle" their value rapidly). It should be noted that a trigger can refer to a specification of a policy(ies)/rule(s)/condition(s) that define when a corrective action(s) should be executed. The policy(ies)/rule(s)/condition(s) can be evaluated based upon the current contents (values) of the parameter buckets. If those values change rapidly due, for example, to incoming events and/or the clearing of events, the value of a policy (ies)/rule(s)/condition(s) may toggle rapidly as well. The aforementioned hashing can be performed as part of the closed loop triggering operation(s) 218 illustrated in FIG. 5. For the aforementioned first level (or level 1), a trigger call, e.g., "callid" may be based on the following: the ID of the triggered operation; the set of computed parameter values for the operation (where expressions in the trigger definition exist for each computed parameter value); and the IDs of the service and underlying system(s)/resource(s) on which the service is configured, if any. In accordance with the aforementioned second level (or level 2), the transactionid may be computed from: the callid defined in the first level; and a current time divided by an expiration time, and further truncated (meaning all calls created within a universal time divided into slots of the size of the expiration time receives/is associated with the same transactionid. The expiration time may be specified in/as part of the trigger.

Figure 7:
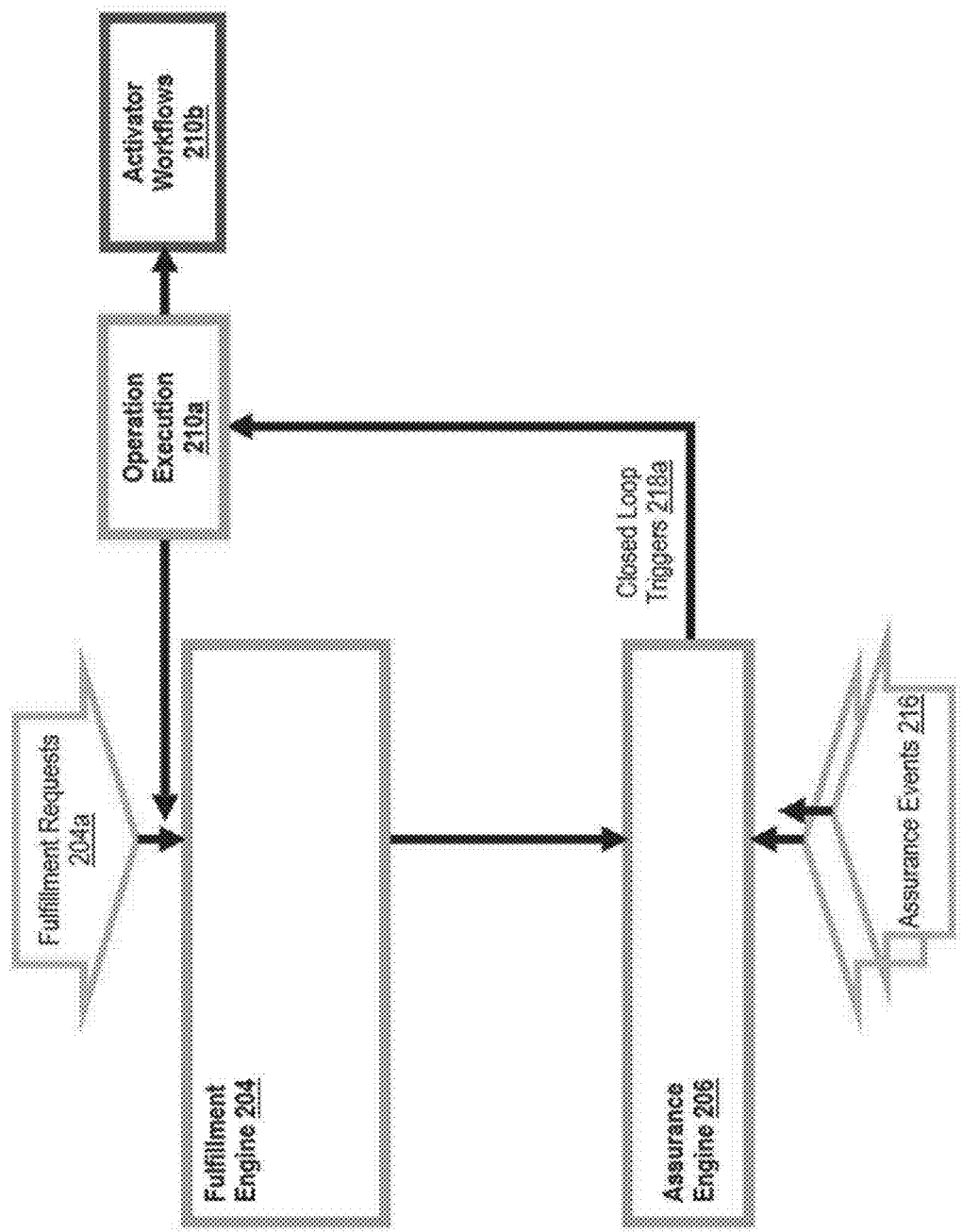
FIG. 7 is a schematic representation of an operating relationship between a service fulfillment engine and a service assurance engine in the example SP system architecture of FIG. 2 in accordance with one embodiment of the disclosed technology.

FIG. 7 illustrates the relationship between service fulfillment and service assurance from another perspective in accordance with various embodiments of the present application. As illustrated in FIG. 7, service fulfillment requests 204*a* may be received by service fulfillment engine 204, where fulfillment requests 204*a* may reflect customer requests to instantiate a service, modify a service, add a service, etc. Service fulfillment engine 204 may provision and effectuate the service/service modifications, etc., which leads to service assurance engine 206, as service assurance is performed to ensure that some desired level of service quality is maintained. At the same time, service assurance events 216 may be received by service assurance engine 206. Again, because service assurance engine 206 attends to maintaining some desired level of service quality, the status of instantiated services must be monitored to identify an events suggesting an issue/problem that may need remediation. As a result of correlating events to services, closed loop triggers 218*a* may be generated to invoke execution of any operations 210*a* to close the loop as described herein. Service activator workflows 210*b*, which can include scripts and/or series of operations that service activator 210 may implement or carry out in furtherance of responding to service fulfillment requests 204*a* (i.e., executing the fulfillment actions 204*c* on the requisite resources comprising infrastructure 104. Service activator workflows 210*b* can encompass operations such as, service modification operations, email/ticket generation, etc.

Figure 8:
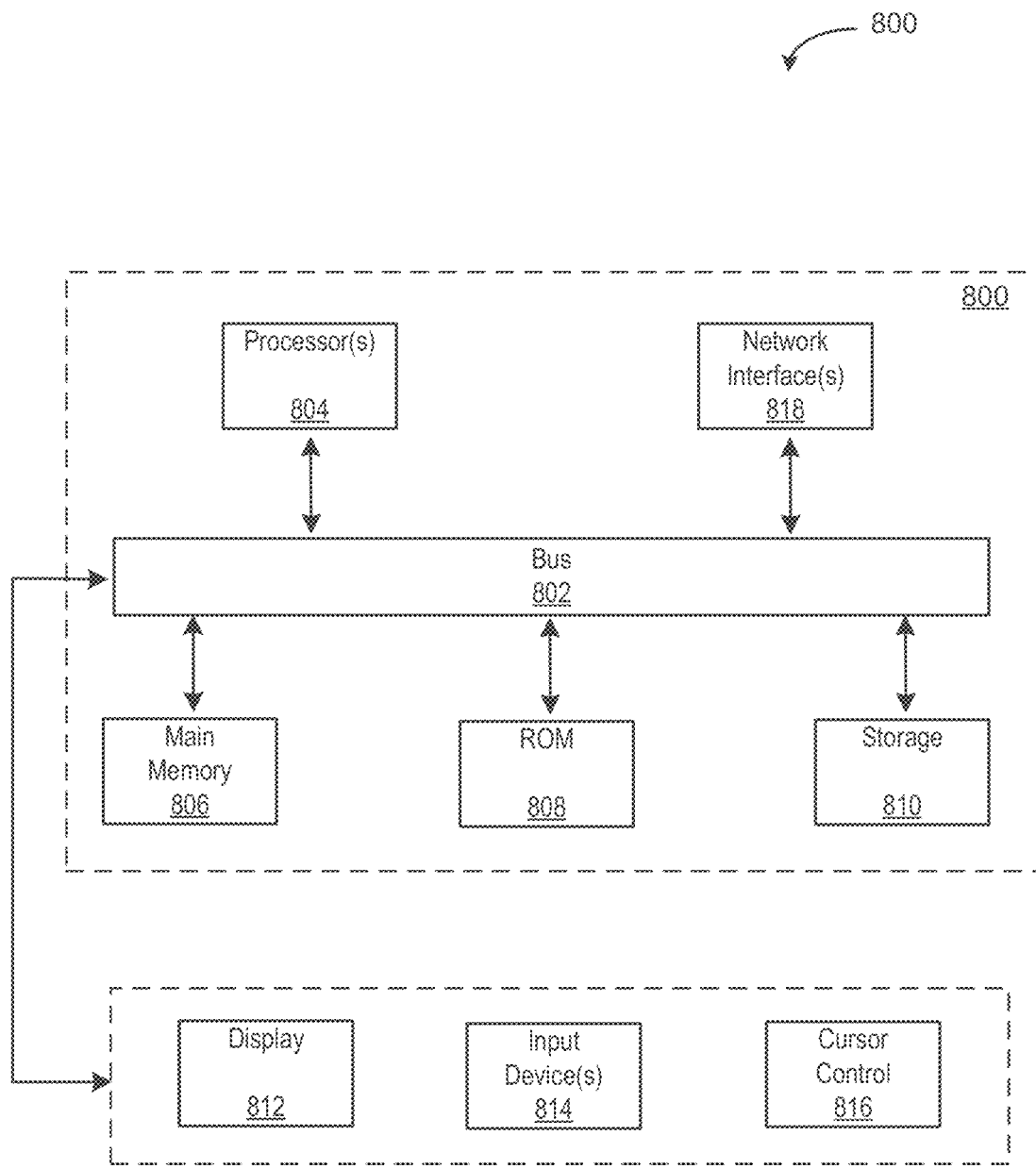
FIG. 8 illustrates an example computing component in which various embodiments described herein may be implemented.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes memory units, such as a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions. Also coupled to bus 802 are a display 812 for displaying various information, data, media, etc., input device 814 for allowing a user of computer system 800 to control, manipulate, and/or interact with computer system 800. One manner of interaction may be through a cursor control 816, such as a computer mouse or similar control/navigation mechanism.

In general, the word "engine," "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:
1. A service assurance system, comprising:
a processor; and
a memory unit operatively connected to the processor and including computer code that when executed, causes the processor to:
obtain configuration parameter values relevant to assuring a determined level of quality regarding services configured by a service fulfillment system operatively connected to the service assurance system;

calculate dependencies between the configuration parameter values, event parameters and fact parameters representative of the services, wherein the configuration parameters values are stored in a cache in a sorted list fashion according to a hierarchy applicable to the calculated dependencies;

monitor the services, and identify events occurring during performance of the services;

correlate the identified events to relevant ones of the event parameters; and determine one or more corrective actions to take by the service assurance system based on the correlation of the identified events to the relevant ones of the event parameters, wherein the one or more corrective actions are fed back into the service fulfillment system to be executed.

2. The service assurance system of claim 1, wherein the corrective actions are executed as a one or more operations of the service fulfillment system.

3. The service assurance system of claim 1, wherein the one or more corrective actions are generated using a unified syntax that is compatible with both the service assurance system and the service fulfillment system.

4. The service assurance system of claim 2, wherein the event parameters and the fact parameters are defined using the unified syntax.

5. The service assurance system of claim 1, wherein the configuration parameters are stored in a service inventory operatively connected to both the service assurance system and the service fulfillment system.

6. The service assurance system of claim 1, wherein the one or more corrective actions are triggered by one or more trigger conditions defined by the service assurance system.

7. The service assurance system of claim 6 wherein the one or more trigger conditions are specified in a trigger, and wherein the trigger is non-duplicative.

8. The service assurance system of claim 5, wherein the one or more corrective actions are non-duplicative.

9. The service assurance system of claim 1, further comprising an enterprise service bus through which the events are identified.

10. The service assurance system of claim 1, wherein the one or more corrective actions comprise at least one of rebooting a virtual machine on which the services are implemented, re-creating the virtual machine, moving the virtual machine to an alternative location, and enabling a stand-by service for the virtual machine.

11. The service assurance system of claim 1, wherein the one or more corrective actions comprise transmitting a notification indicative of an incident involving at least one of the one or more services for manual remediation.

12. The service assurance system of claim 1, wherein values of the fact parameters are at least one of fetched from a service inventory, evaluated based on the calculated dependencies, and derived based on the correlation of the identified events to the relevant ones of the event parameters.

13. The service assurance system of claim 1, further comprising the cache wherein the configuration parameter values are stored.

14. The service assurance system of claim 1, further comprising an incident records repository maintaining incident records associated with manual remediation.

15. The method of claim 11, wherein the one or more corrective actions are generated using a unified syntax that is compatible with both the service assurance system and the service fulfillment system.

16. A method of unified service fulfillment and service assurance, comprising:

provisioning by a service fulfillment system, a service in response to a first service fulfillment request from a customer, the service comprising a software and hardware-based orchestration of changes amongst one or more physical or virtual resources;

activating the service in accordance with the provisioning of the service;

identifying by a service assurance system, one or more events indicative of issues involving one or more resources provisioned by the service fulfillment system to carry out instantiation of the service;

assigning values to parameters reflecting the one or more events in a cache of the service assurance system, the parameters being stored in the cache in accordance with a hierarchical dependency graph; and upon correlating by the service assurance system, the one or more events to the instantiation of the service, and upon determining one or more trigger conditions are met, executing, by the service fulfillment system, one or more corrective actions triggered by the one or more trigger conditions, the service being defined as a model specified using a universal language understandable by both the service fulfillment system and the service assurance system.

17. The method of claim 16, wherein the universal language comprises a service descriptor-based language.

18. The method of claim 16, further comprising hashing at least one of the one or more trigger conditions and the one or more corrective actions to avoid duplication of the one or more trigger conditions and the one or more corrective actions.

19. The method of claim 16, further comprising defining the service in accordance with the universal language in a service inventory repository common to the service fulfillment system and the service assurance system.

20. A method of unified service fulfillment and service assurance, comprising:

obtaining configuration parameter values relevant to assuring a determined level of quality regarding services configured by a service fulfillment system operatively connected to a service assurance system;

calculating dependencies between the configuration parameter values, event parameters, and fact parameters representative of the services, wherein the configuration parameters values are assigned to the event parameters in a cache of the service assurance system, the parameters being stored in the cache in accordance with a hierarchical dependency graph;

monitoring the services, and identifying events occurring during performance of the services;

correlating the identified events to relevant ones of the event parameters; and determining one or more corrective actions to take by the service assurance system based on the correlation of the identified events to the relevant ones of the event parameters, wherein the one or more corrective actions are fed back into the service fulfillment system to be executed.

* * * * *